(12) United States Patent
Bortolozzo

(10) Patent No.: US 11,976,963 B2
(45) Date of Patent: May 7, 2024

(54) FIBRE-OPTIC ACOUSTIC SENSOR AND ASSOCIATED MEASUREMENT SYSTEM, VEHICLE AND MEASUREMENT METHOD

(71) Applicant: HOASYS, Valbonne (FR)

(72) Inventor: Umberto Bortolozzo, Juan les Pins (FR)

(73) Assignee: HOASYS, Valbonne (FR)

( * ) Notice: Subject to any disclaimer, the term of this patent is extended or adjusted under 35 U.S.C. 154(b) by 242 days.

(21) Appl. No.: 17/612,910

(22) PCT Filed: May 19, 2020

(86) PCT No.: PCT/EP2020/063992
§ 371 (c)(1),
(2) Date: Nov. 19, 2021

(87) PCT Pub. No.: WO2020/234309
PCT Pub. Date: Nov. 26, 2020

(65) Prior Publication Data
US 2022/0244096 A1    Aug. 4, 2022

(30) Foreign Application Priority Data

May 20, 2019  (FR) ..................................... 1905243

(51) Int. Cl.
*G01H 9/00* (2006.01)
*G01D 5/353* (2006.01)
(Continued)

(52) U.S. Cl.
CPC ......... *G01H 9/004* (2013.01); *G01D 5/35309* (2013.01); *G01L 1/242* (2013.01); *G01L 1/255* (2013.01); *G01V 1/226* (2013.01)

(58) Field of Classification Search
CPC .... G01H 9/004; G01D 5/35309; G01L 1/242; G01L 1/255; G01V 1/226; G01V 1/38
See application file for complete search history.

(56) References Cited

U.S. PATENT DOCUMENTS

| 4,525,626 A | 6/1985 | Kush et al. |
| 4,854,706 A | 8/1989 | Claus et al. |
| (Continued) | | |

FOREIGN PATENT DOCUMENTS

| AU | 2020280807 A1 * 12/2021 ......... G01D 5/35309 |
| CN | 114235134 A  *  3/2022 |
| (Continued) | |

OTHER PUBLICATIONS

International Search Report for PCT/EP2020/063992 dated Jul. 27, 2020, 4 pages.

(Continued)

*Primary Examiner* — Daniel Pihulic
(74) *Attorney, Agent, or Firm* — NIXON & VANDERHYE

(57) ABSTRACT

Disclosed is an acoustic sensor including: —a component having an input and an output, the component being able to conduct light waves in a plurality of propagation modes between the input and the output, the component converting an acoustic signal to be measured into a phase shift proportional to an intermodal interference between at least two propagation modes, and —a detector of a physical quantity dependent on the phase shift.

19 Claims, 9 Drawing Sheets

Figure 1:
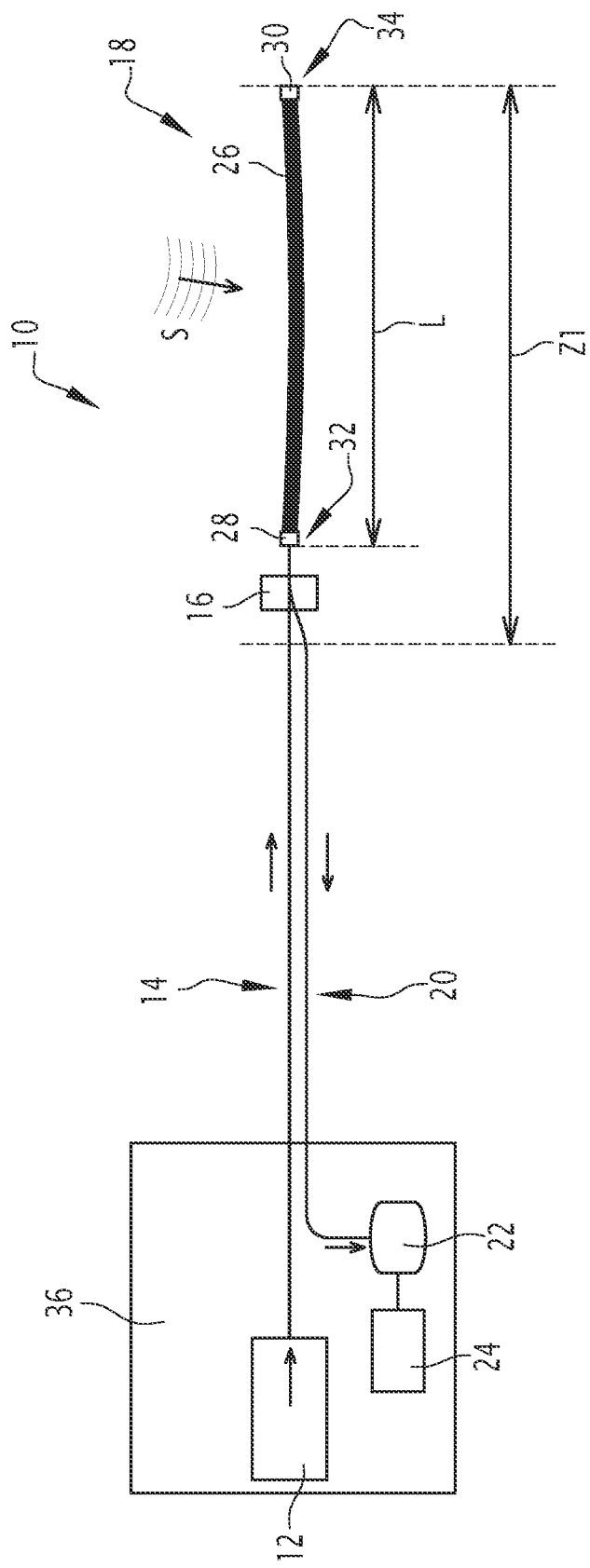

(51) Int. Cl.
*G01L 1/24* (2006.01)
*G01L 1/25* (2006.01)
*G01V 1/22* (2006.01)

(56) References Cited

U.S. PATENT DOCUMENTS

| | | | |
|---|---|---|---|
| 5,732,046 A * | 3/1998 | O'Donnell | ............ G01H 9/004 |
| | | | 73/632 |
| 6,515,939 B1 * | 2/2003 | Green | ................... G01H 9/004 |
| | | | 367/149 |
| 10,126,163 B2 * | 11/2018 | Huignard | ........... G01D 5/35364 |
| 2009/0260501 A1 | 10/2009 | Kashyap | |
| 2018/0003551 A1 * | 1/2018 | Huignard | ........... G01D 5/35364 |
| 2022/0244096 A1 * | 8/2022 | Bortolozzo | ............ G01L 1/242 |

FOREIGN PATENT DOCUMENTS

| | | | |
|---|---|---|---|
| EP | 0 326 476 | 8/1989 | |
| FR | 3096453 B1 * | 6/2021 | ......... G01D 5/35309 |
| WO | WO-9740643 A1 * | 10/1997 | ............. G01H 9/004 |
| WO | WO-2020234309 A1 * | 11/2020 | ......... G01D 5/35309 |

OTHER PUBLICATIONS

Written Opinion of the ISA for PCT/EP2020/063291 dated Jul. 27, 2020, 9 pages.
Search Report for FR 1905243, dated Feb. 7, 2020, 2 pages.
Beard et al., Miniature Optical Fibre Ultrasonic Hydrophone Using a Fabry-Perot Polymer Film Interferometer, Electronics Letters Online No. 19970545, University College London, Department of Medical Physics and Bioengineering, London, UK, Feb. 20, 1997, 2 pages.
Layton et al., Optical Fibre Acoustic Sensor Utilizing mode-mode interference, 2219 Applied Optics Optical Society of America, Washington, DC, vol. 18, No. 5, Mar. 1, 1979, pp. 666-670.
Rashleigh, Acoustic Sensing with a Single Coiled Monomode Fiber, Optics Letters, Optical Society of America, vol. 5, No. 9, Sep. 1980, Washington, DC, 3 pages.

* cited by examiner

FIBRE-OPTIC ACOUSTIC SENSOR AND ASSOCIATED MEASUREMENT SYSTEM, VEHICLE AND MEASUREMENT METHOD

This application is the U.S. national phase of International Application No. PCT/EP2020/063992, filed May 19, 2020 which designated the U.S. and claims priority to French Patent Application No. 1905243 filed May 20, 2019, the entire contents of each of which are hereby incorporated by reference.

The present invention relates to an acoustic sensor. It also relates to corresponding measurement system, vehicle and measuring method.

High sensitivity acoustic detection is of interest for many applications such as coastal surveillance, detection and/or identification of submarines and surface vessels, underwater biology, monitoring offshore structures or seismic surveys and structure control. More generally, underwater acoustic detection is used in both military and civilian applications.

Due to the development of new autonomous systems such as aerial drones, UAVs and underwater gliders, for example, it is desirable for systems making acoustic detection possible in an underwater environment to be more compact and less energy consuming while retaining a high sensitivity.

For such an objective, multiple acoustic measurement systems based on microphones or on optical fiber have been developed.

However, each of these high sensitivity measurement systems has a high energy consumption.

There is a thus need for an acoustic sensor that makes measurement of an acoustic signal possible with low energy consumption but without a loss of accuracy in the measurement.

For this, the present description relates to an acoustic sensor comprising a component having an input and an output, the component being able to conduct light waves in a plurality of propagation modes between the input and the output, the component converting an acoustic signal to be measured into a phase shift proportional to an intermodal interference between at least two propagation modes, and a detector of a physical quantity dependent on the phase shift.

According to particular embodiments, the sensor comprises one or more of the following features, taken alone or in any technically possible combination:
- the component comprises a multimode optical fiber, positioned between two reflectors to form a cavity.
- the distance between the component input and the component output is greater than or equal to 5 centimeters.
- the distance between the component input and the component output is greater than or equal to 200 meters.
- the detector, in particular a photodetector, is suitable for detecting at least one of the frequency and the amplitude of an incident signal.

The present description relates to a measurement system comprising at least one acoustic sensor as above, the measurement system further comprising a light source suitable for generating a light beam and arranged to illuminate the input of the component, the light source preferably having a coherence length greater than or equal to 300 meters.

According to particular embodiments, the measurement system comprises one or more of the following features, taken alone or in any technically possible combination:
- the measurement system further comprises fibers arranged to offset the light source and the detector.
- the measurement system further comprises a controller able to deduce characteristics of the acoustic signal from the detected physical quantity.

The present description also relates to a measurement system comprising at least two acoustic sensors as previously described, the sensor components being offset, two by two.

According to particular embodiments, the measurement system includes one or more of the following features, taken alone or in any technically possible combination:
- either the measurement system comprises one detector per sensor or the measurement system comprises a single amplitude and/or frequency modulated light source and a single detector, with each sensor being associated with a respective light source pulse or frequency.
- the measurement system further comprises a controller able to deduce characteristics of the acoustic signal from the physical quantity detected.
- one reflector has a reflection coefficient of between 0.2% and 20%, preferably between 0.90% and 1.10% at the light source emission wavelength of the.
- the reflector has a reflection coefficient of between 0.2% and 20%, preferably between 0.90% and 1.10%, at the emission wavelength of the light source and is positioned at the input of the component.
- one reflector has a reflection coefficient greater than 60% at the emission wavelength of the light source, advantageously greater than 90%, preferably greater than 95% and more preferably greater than 99%.
- one reflector is an interface between two media, in particular an air-glass interface.

The present description also relates to a vehicle equipped with a sensor or a measurement system as previously described.

The present description also relates to a method for measuring an acoustic signal, the method comprising the detection of a physical quantity by a detector forming part of an acoustic sensor comprising said detector and a component having an input and an output, the component being able to conduct light waves according to a plurality of propagation modes between the input and the output, the component converting an acoustic signal to be measured into a phase shift proportional to an intermodal interference between at least two propagation modes, the physical quantity dependent on the phase shift.

Figure 2:
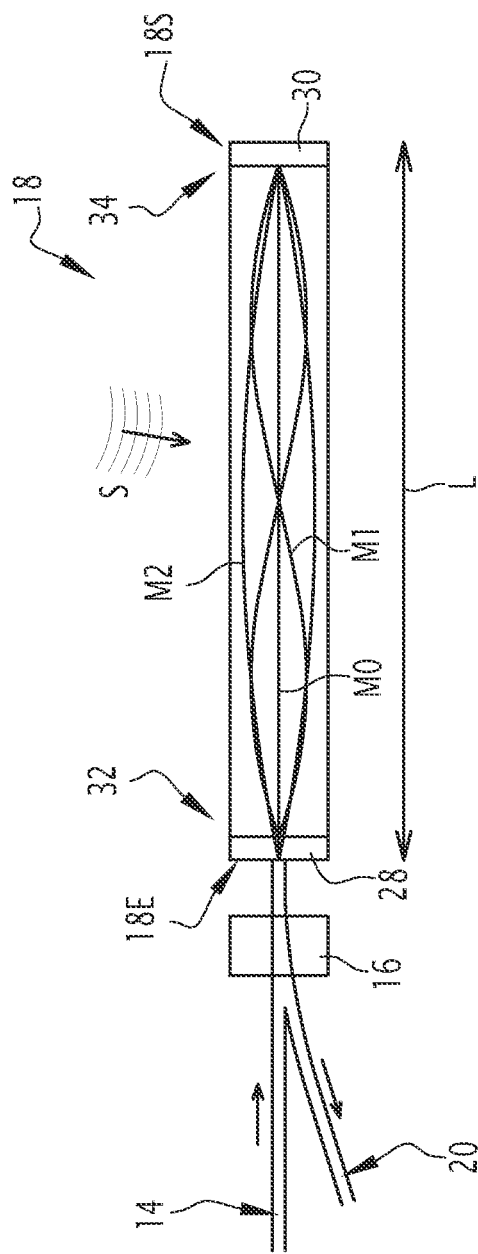
Figure 3:
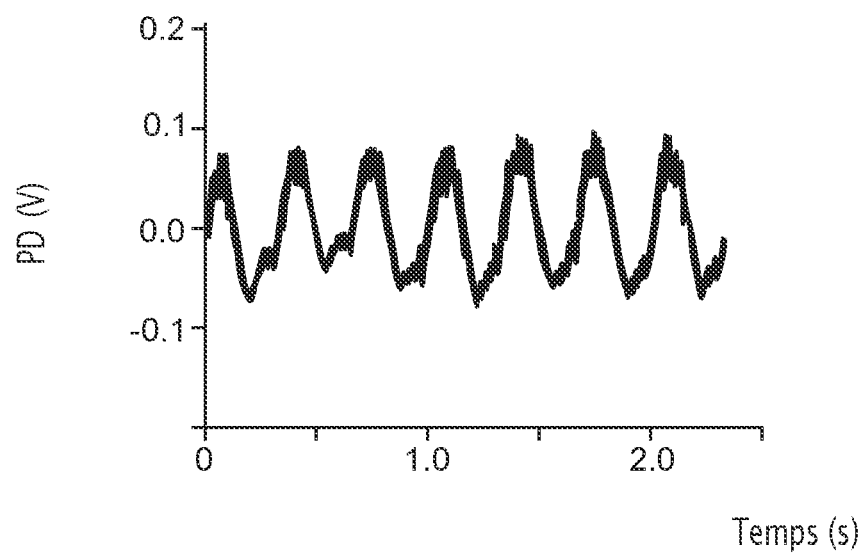
Figure 4:
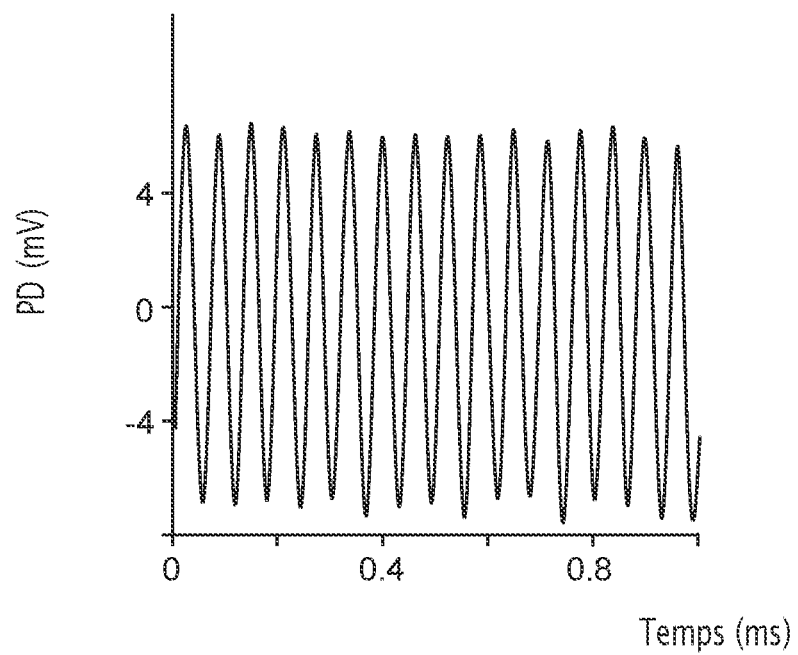
Figure 5:
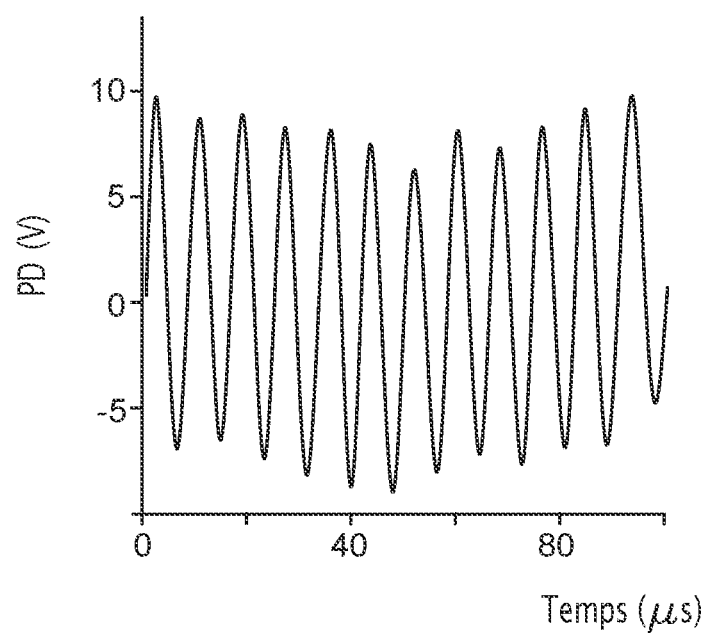
Figure 6:
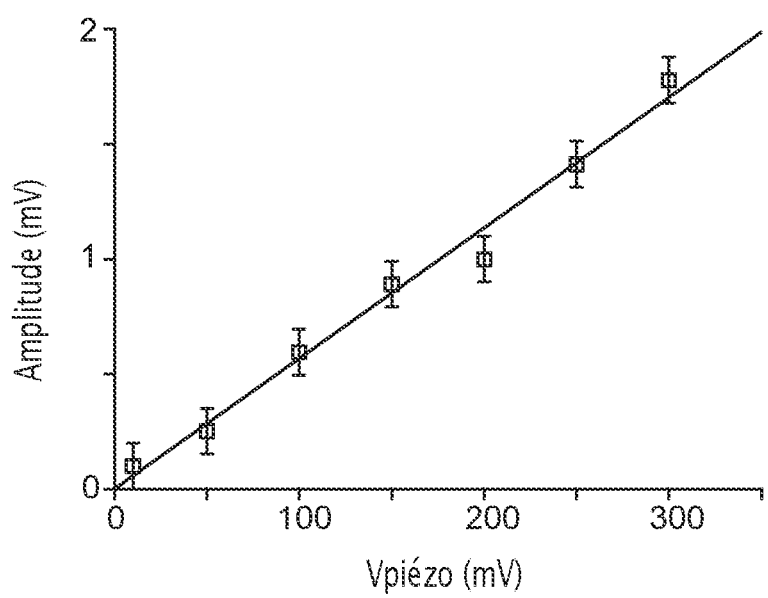
Figure 7:
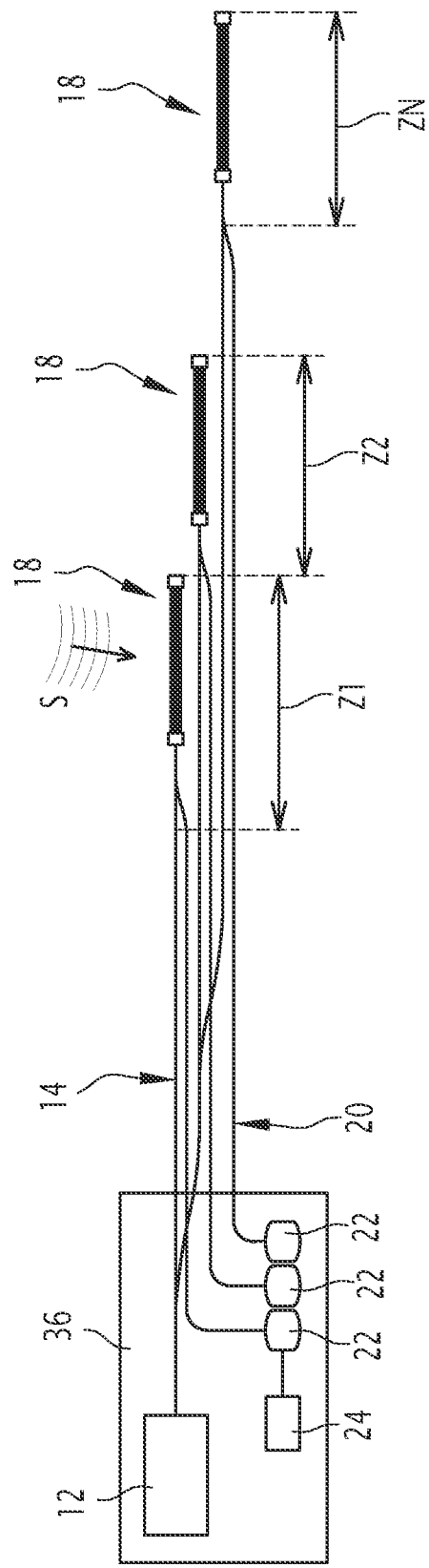
Figure 8:
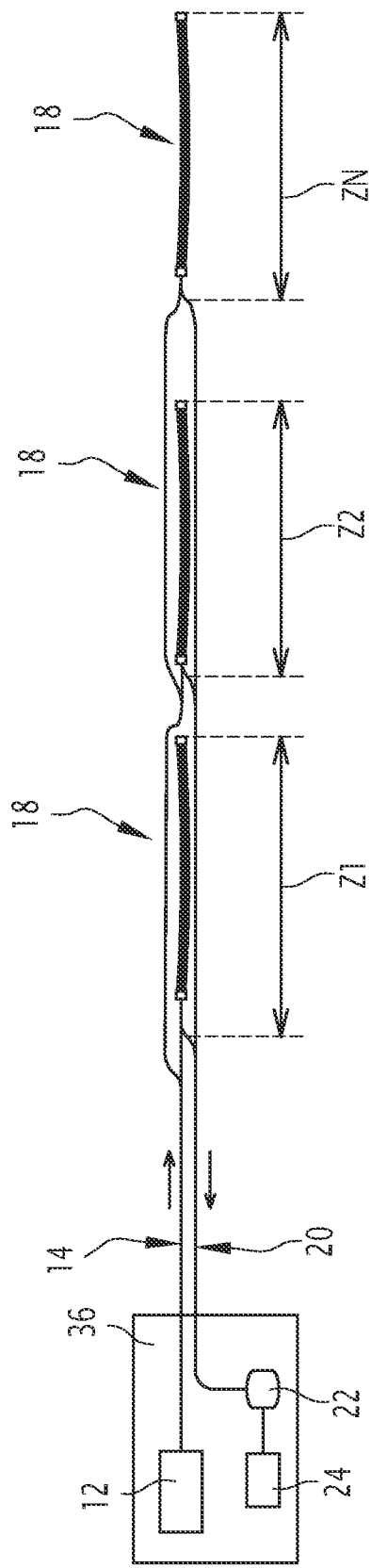
Figure 9:
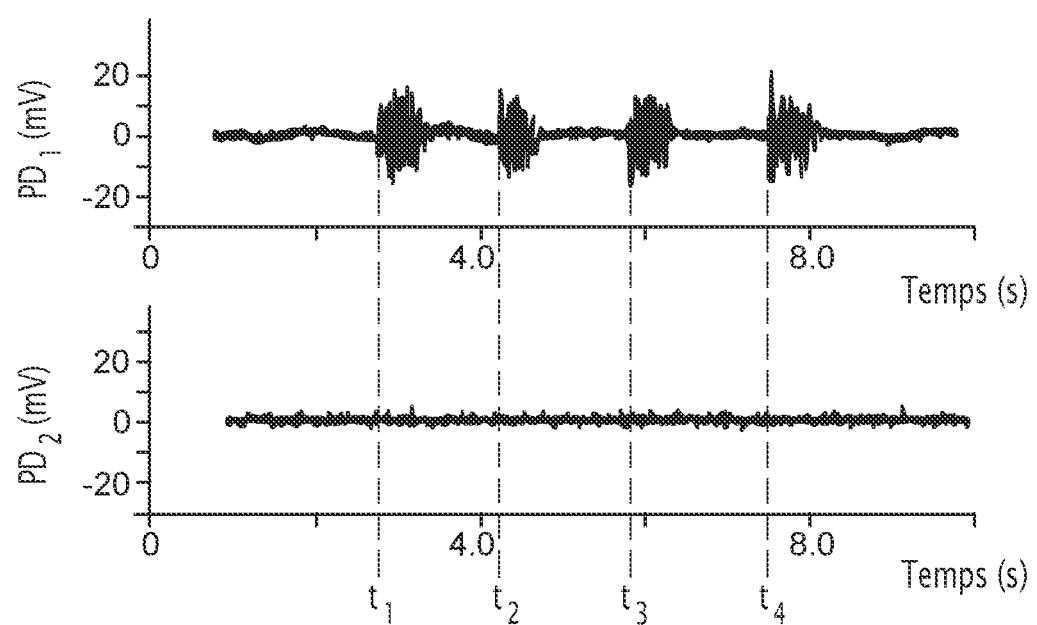

Further features and advantages of the invention will become apparent from the following description of embodiments of the invention, only given by way of example and with reference to the drawings which are:

FIG. 1, a schematic view of an example of an acoustic measurement system;

FIG. 2, an enlarged view of part of the measurement system of FIG. 1;

FIG. 3, a graph showing the evolution over time of the voltage measured at the terminals of a detector forming part of the measurement system of FIG. 1;

FIG. 4, a graph showing the evolution over time of the voltage measured at the terminals of a detector forming part of the measurement system of FIG. 1;

FIG. 5, a graph showing the evolution over time of the voltage measured at the terminals of a detector forming part of the measurement system of FIG. 1;

FIG. 6, a graph showing the evolution of the voltage measured at the terminals of a detector forming part of the measurement system of FIG. 1 depending on the amplitude of the acoustic signal to be measured;

FIG. 7, a schematic view of another example of an acoustic measurement system;

FIG. 8, a schematic view of still another example of an acoustic measurement system, and FIG. 9, a graph showing the evolution over time of the voltage measured at the terminals of two detectors, each forming part of the measurement system of FIG. 7.

An acoustic signal measurement system 10 is shown in FIG. 1.

The measurement system 10 is suitable for measuring the characteristics of an acoustic signal to be measured.

As an example, the characteristics are the amplitude and frequency of the acoustic signal.

By extension, the presence of the acoustic signal is considered a characteristic.

The measurement system 10 comprises a light source 12, a first optical fiber 14, a splitter 16, a component 18, a second optical fiber 20, a detector 22 and a controller 24.

The light source 12 is a source suitable for emitting light waves continuously.

The light source 12 is a laser, such as a laser diode.

The light source 12 is preferably a light source emitting at a wavelength of between 0.5 micrometers (µm) and 1.7 µm.

In the case of FIG. 1, the emission wavelength of the light source 12 is equal to 1.55 µm.

The light source 12 has a coherence length $L_c$.

The coherence length $L_c$ is greater than 30 meters (m), preferably greater than or equal to 500 m and preferably greater than or equal to 1000 m.

By definition, the coherence length $L_c$ corresponds to the speed of light divided by the spectral spread of the light source 12. Measuring the latter thus makes it possible to access the coherence length $L_c$.

In the proposed example, the coherence length $L_c$ is greater than or equal to 1000 m.

The first optical fiber 14 extends between the light source 12 and the splitter 16.

The first optical fiber 14 is an offset fiber in the sense that the first optical fiber 14 makes it possible to move the light source 12 away from the component 18.

According to the example in FIG. 1, the first optical fiber 14 is a single mode fiber.

The splitter 16 serves to separate the beam incident on the component 18 from the beam returning from the component 18.

In the described case, the splitter 16 is an optical circulator.

The component 18 has an input 18E and an output 18S.

The component 18 is able to conduct light waves in a plurality of propagation modes between the input 18E and the output 18S.

The component 18 is suitable for converting an acoustic signal to be measured into a phase shift proportional to an intermodal interference between at least two propagation modes.

According to the proposed example and as visible in FIG. 2, the component 18 includes a multimode optical fiber 26 and two reflectors 28 and 30.

The multimode optical fiber 26 extends between two ends 32 and 34, a proximal end 32 on the side of the light source 12 and a distal end 34 on the opposite side.

By definition, a multimode optical fiber is suitable for conducting incident light from the proximal end 32 to the distal end 34 along several different optical paths. Each optical path corresponds to a propagation mode.

In the example shown in FIG. 2, three optical paths are shown.

The shortest optical path (the straight line) is called the fundamental mode M0 and the longest optical path corresponds to the highest M2 mode. The optical path of intermediate size between the two corresponds to the mode indicated M1 in FIG. 2.

In this case, the multimode optical fiber 26 is a fiber with an index gradient.

Furthermore, the multimode optical fiber 26 has a core having a diameter of greater than or equal to 50 µm. In the proposed case, the core diameter is equal to 62.5 µm.

Furthermore, the multimode optical fiber 26 has a numerical aperture of greater than 0.15.

According to the proposed example, the numerical aperture of the multimode optical fiber 26 is 0.275.

The multimode optical fiber 26 has a length noted as L.

The length L of the multimode optical fiber 26 is greater than or equal to 5 centimeters (cm), preferably greater than or equal to 10 m, advantageously greater than or equal to 20 m.

In the present example, the multimode optical fiber 26 has a length L of 10 m.

Each reflector 28 and 30 is suitable for reflecting at least part of an incident beam.

Thus, one reflector 28 and 30 is a mirror in the broad sense, encompassing interfaces between two partially reflective media in particular.

According to one particular embodiment, the reflectors 28 and 30 are mirrors in the strict sense.

The two reflectors 28 and 30 are positioned at the respective proximal end 32 and distal end 34.

The first reflector 28 is partially reflective.

According to the proposed example, the first reflector 28 is formed by the air/glass interface at the proximal end 32 of the multimode optical fiber 26.

The first reflector 28 has a reflection coefficient of the order of 1% at the emission wavelength of the light source 12. By the expression "of the order of", between 0.90% and 1.10% is understood.

In contrast, the second reflector 30 has a relatively high reflection coefficient, greater than 95%, for example, advantageously greater than 99%.

According to the proposed example, the second reflector 30 is a mirror in the strict sense.

The second optical fiber 20 extends between the splitter 16 and the detector 22.

The second optical fiber 20 is an offset fiber, in the sense that the second optical fiber 20 makes it possible to move the detector 22 away from the component 18.

According to the example in FIG. 1, the second optical fiber 20 is a single mode fiber.

According to the proposed example, the first optical fiber 14 and the second optical fiber 20 have the same length.

This makes it possible to position the detector 22 and the light source 12 in the same housing 36, to reduce the footprint of the measurement system 10.

In the proposed case, the first optical fiber 14 and the second optical fiber 20 have a length greater than 250 m, in this case equal to 500 m.

The detector 22 is suitable for detecting a physical quantity dependent on the phase shift.

In the proposed example, the detector 22 detects the amplitude of an incident light signal, the incident light signal coming from the component 18.

In the particular case shown in FIG. 1, the detector 22 is a photodetector, specifically a photodiode.

Together, the component 18 and the detector 22 form an acoustic sensor.

The controller 24 is able to deduce at least one characteristic of the acoustic signal to be measured from the physical quantity detected.

For example, the controller 24 is suitable for obtaining the amplitude, frequency and phase of the acoustic signal from the amplitude measured by the detector 22.

The operation of the measurement system 10 of FIG. 1 is now described with reference to a method for measuring an acoustic signal.

During the measurement method, the light emitted by the light source 12 is injected into the first optical fiber 14.

The light propagates through the first optical fiber 14 to the splitter 16.

The splitter 16 lets the light pass through to illuminate the component 18.

In the component 18, the cavity formed by multimode fiber 26 and between the two reflectors 28 and 30 acts as an interferometer, with interference being produced between the modes propagating in the multimode fiber 26.

Specifically, in the presence of an acoustic disturbance of pulsation ω, the length of the multimode optical fiber 26 becomes:

$$L + \Delta\varepsilon - L - \sin(\omega t)$$

where Δε is the stretching of the fiber at the pulsation ω.

It is then possible to show that the intermodal phase shift between the fundamental mode and the higher order mode is written:

$$\Delta\varphi = \frac{2\pi}{\lambda}\alpha NL\Delta\epsilon$$

where:

λ is the wavelength of the light source 12,

α a is a coefficient dependent on the numerical aperture of the multimode optical fiber 26, refractive indices in the different areas of the multimode optical fiber 26 and the type of multimode optical fiber 26 used, N is the number of round trips of the light in the cavity. N depends on the reflection coefficients of the two reflectors 26 and 28 and on the length of coherence $L_c$ of the light source 12.

It thus appears that the component 18 amplifies the sensitivity to acoustic disturbances due to the round trips in the multimode optical fiber 18. The acoustic disturbance translates into an intermodal phase shift due to the modal dispersion in the multimode optical fiber 18. The intermodal interference will produce an optical intensity modulation at the output of the component 18 through the first reflector 28.

The optical signal at the output of the interferometer is returned through the splitter 16.

The splitter 16, due to its arrangement, sends the optical signal to the second optical fiber 20.

The second optical fiber 20 carries the optical signal to the detector 22.

The detector 22 measures the optical signal intensity, which depends on the intermodal phase shift in the multimode optical fiber 26.

From the intensity measured, the controller 24 determines a property of the acoustic signal to be measured.

For example, the controller 24 uses a conversion law between the measured intensity and the amplitude of the acoustic signal to be measured.

According to a very simple example, the conversion law is an affine law.

The measurement method thus makes it possible to determine at least one characteristic of an acoustic signal to be measured.

The ability of the measurement system 10 of FIG. 1 to accurately determine characteristics of an acoustic signal to be measured has been demonstrated experimentally with reference to FIGS. 3-6.

Each of FIGS. 3-5 is a graphical representation of the evolution over time of the voltage across the detector 22 for three respective acoustic excitations.

In the proposed experiment, the acoustic excitation is generated by a piezoelectric transmitter.

The first excitation, having led to the signal visible in FIG. 3, is a sinusoidal excitation at a frequency of 3 Hertz (Hz), the second excitation, having led to the signal visible in FIG. 7, is a sinusoidal excitation at a frequency of 15 kilohertz (kHz) and the third excitation, having led to the signal visible in FIG. 5, is a sinusoidal excitation at a frequency of 120 kHz.

Analysis of FIGS. 3 to 5 clearly shows that the detector 22 detects an optical signal of a sinusoidal nature having a frequency substantially equal to the frequency of the acoustic excitation.

In the case of the second excitation, the amplitude response of the measurement system 10 was also tested.

FIG. 6 thus shows the voltage response of the detector 22 for a variable excitation. Specifically, FIG. 6 shows the amplitude of the measured signal depending on the amplitude of the voltage applied to the piezoelectric transmitter.

The fact that the curve obtained in FIG. 6 is linear shows that the sensitivity of the measurement system 10 is good, which results in in a good quality measurement.

The present measurement system 10 thus has an increased sensitivity due to the intermodal interference effect in the multimode optical fiber 26 acting as a transducer in an optical cavity.

Furthermore, it should be noted that the previous formula giving the intermodal phase shift shows that the sensitivity of the measurement system 10 will increase linearly with the length L of the multimode optical fiber 26 and with the coherence length LC of the light source 12.

It is thus easy to make the measurement system 10 more sensitive if needed, without changing the entire measurement system 10.

In addition, the measurement system 10 has a wide bandwidth of detectable acoustic frequencies. Indeed, the bandwidth of the measurement system 10 is equal to the size of the photodetector bandwidth.

Moreover, the measurement system 10 has a low energy consumption. Indeed, the only active components are the light source 12 and the detector 22.

In the experimental example, the energy consumed by the measurement system 10 is less than 1 W.

The measurement system 10 thus makes measurement of an acoustic signal possible with low energy consumption and without a loss of accuracy in the measurement.

Such a measurement system 10 can be part of a larger system, such as acoustic antennas or hydrophones.

Because of its compactness and low power consumption, the measurement system 10 is particularly suitable for on-board applications, especially for equipping a terrestrial or submarine vehicle.

Other embodiments are conceivable for the measurement system 10.

Two proposals are illustrated in FIGS. 7 and 8.

In the following description, identical elements between the embodiment of FIG. 1 and the embodiments of FIGS. 7 and 8 are not described again, in order to not make the description more cumbersome. Only differences in the measurement system 10 of FIG. 1 are described more specifically.

In each case, the measurement system 10 comprises at least two acoustic sensors 12.

The number of components 18 is denoted N.

In the case of FIG. 7 or 8, N is an integer greater than or equal to 3, preferably greater than or equal to 10, advantageously greater than or equal to 20.

The components 18 of the sensors 12 are staggered two by two.

More specifically, the components 18 are offset along the propagation direction of the light beam emitted by the light source 12.

In the proposed example, there is no overlap between the components 18.

By overlap in this context, it should be understood that the projection of each component 18 on an axis parallel to the propagation direction of the light beam has no intersection with any other projection of another component 18.

However, in the case of FIG. 7, the components 18 are also offset along a direction perpendicular to the propagation direction of the light beam, whereas the components 18 are aligned in the case of FIG. 8.

Each component 18 is thus associated with its own acoustic signal detection area.

The first component 18 (the one closest to the light source 12) is associated with a first spatial area Z1, the second component 18 is associated with a second spatial area Z2 adjacent to the first spatial area Z1, and so on, until the $N^{th}$ component 18 (the one closest to the light source 12) which is associated with the $N^{th}$ spatial area ZN.

The measurement systems 10 of FIGS. 7 and 8 vary only on the interrogation of the multimode optical fibers 26 carried out.

Visually, the measurement system 10 of FIG. 7 could be considered to correspond to spatial multiplexing, while the measurement system 10 corresponds to a temporal multiplexing.

More specifically, in the case of FIG. 7, the measurement system 10 has one detector 22 per sensor.

To maintain the uniqueness of the light source 12, a coupler 1*N is also used, making it possible to divide the optical signal emitted by the light source 12 into N incident signals, which are then injected into each component 18.

In contrast, for the case of FIG. 8, the measurement system 10 includes a single amplitude and/or frequency modulated light source 12 and a single sensor 22, each sensor being associated with a respective temporally separated pulse and/or frequency of the light source 12.

In the case of FIG. 8, the duration of the laser pulse is less than or equal to 2L/c, where c denotes the speed of the light in the multimode optical fiber 26.

In the example described, the N components 18 are connected sequentially through a 1×2 fiber gate. The signals reflected back from each component 18 are fed back through a fiber gate to the offset fiber connected to the detector 22.

At the detector 22, the detected signal is composed of N temporally separated pulses. The amplitudes of each of the pulses are modulated depending on the acoustic signal to be measured.

The fact that the above configurations makes it possible to distinguish the spatial position of an acoustic disturbance has been demonstrated experimentally in the case of the measurement system 10 in FIG. 7.

This experimental demonstration corresponds to the case of FIG. 9, which shows the evolution over time of the optical signal detected by the first detector 22 associated with the first component 18 and that of the optical signal detected by the second detector 22 associated with the second component 18.

This distinction between the spatial areas of detection clearly appears in FIG. 8, which shows that for an acoustic excitation in the first spatial area Z1, only the first detector 22 reacts, with the second detector 22 not reacting. In fact, only the first detector 22 detects a change in the light signal.

This shows that the measurement systems 10 in FIGS. 7 and 8 can additionally determine the spatial origin of an acoustic signal.

The measurement system 10 of FIGS. 7 and 8 is thus also an acoustic sensor making it possible to measure an acoustic signal with low energy consumption and without loss in accuracy in the measurement.

Other embodiments are also conceivable.

In particular, to further increase the signal-to-noise ratio, the detector 22 is provided with synchronous detection. In such a case, the light source 12 is amplitude modulated with a reference frequency.

The above-described embodiments may be combined to form other embodiments where this is technically possible.

The invention claimed is:

1. A method for measuring an acoustic signal, the method comprising:
    detecting a physical quantity by a detector forming part of an acoustic sensor comprising a component having an input and an output, the component being configured to conduct light waves according to a plurality of propagation modes between the input and the output, the component converting an acoustic signal to be measured into a phase shift proportional to an intermodal interference between at least two propagation modes, the physical quantity depending on the phase shift, the component comprising a multimode optical fiber, positioned between two reflectors, to form a cavity; and
    generating a light beam and illuminating the input of the component, by a light source.

2. A system for measuring an acoustic signal, the measurement system comprising:
    at least one acoustic sensor comprising
        a component having an input and an output, the component being configured to conduct light waves in a plurality of propagation modes between the input and the output, the component converting an acoustic signal to be measured into a phase shift proportional to an intermodal interference between at least two propagation modes, the component comprising a multimode optical fiber, positioned between two reflectors, to form a cavity, and
        at least one detector of a physical quantity dependent on the phase shift; and
    a light source configured to generate a light beam and to illuminate the input of the component.

3. The system according to claim 2, wherein the distance between the input of the component and the output of the component is greater than or equal to 5 centimeters.

4. The system according to claim 2, wherein the at least one detector is configured to detect at least one of the frequency and the amplitude of an incident signal.

5. The measurement system according to claim 2, wherein the detector is a photodetector.

6. The measurement system according to claim 2, further comprising a plurality of fibers configured to offset the light source and the at least one detector.

7. The measurement system according to claim 2, wherein the at least one acoustic sensor comprises at least two acoustic sensors, components of the at least two acoustic sensors being offset in pairs.

8. The measurement system according to claim 7, wherein the at least one detector includes one detector per acoustic sensor, each of the acoustic sensors being associated with a respective pulse or frequency of the light source.

9. The measurement system according to claim 2, further comprising a controller configured to derive acoustic signal characteristics from the detected physical quantity.

10. The measurement system according to claim 2, wherein at least one of the reflectors has a reflection coefficient of between 0.90% and 1.10% at the emission wavelength of the light source.

11. The measurement system of claim 10, wherein the at least one reflector having the reflection coefficient of between 0.90% and 1.10% at the emission wavelength of the light source is positioned at the input of the component.

12. The measurement system of claim 10, wherein at least one of the reflectors has a reflection coefficient of greater than 95% at the emission wavelength of the light source.

13. The measurement system according to claim 10, wherein at least one of the reflectors is an interface between two media.

14. A vehicle comprising:
the measurement system according to claim 2.

15. The measurement system according to claim 13, wherein the interface is an air-glass interface.

16. The measurement system according to claim 2, wherein the distance between the input of the component and the output of the component is greater than or equal to 200 meters.

17. The measurement system according to claim 2, wherein the light source has a coherence length of greater than or equal to 300 meters.

18. The measurement system of claim 12, wherein at least one of the reflectors has a reflection coefficient of greater than 99% at the emission wavelength of the light source.

19. The measurement system according to claim 7, wherein the light source is one or more of a single amplitude light source and a frequency modulated light source, the at least one detector is a single detector, each of the acoustic sensors being associated with a respective pulse or frequency of the light source.

* * * * *